(12) United States Patent
Ranney et al.

(10) Patent No.: US 10,911,085 B1
(45) Date of Patent: Feb. 2, 2021

(54) METHOD AND APPARATUS FOR PERFORMING SIGNAL AUGMENTATION

(71) Applicant: U.S. Army Combat Capabilities Development Command, Army Research Laboratory, Adelphi, MD (US)

(72) Inventors: Kenneth I. Ranney, Monrovia, MD (US); Kyle A. Gallagher, Silver Spring, MD (US); John C. Merritt, IV, Laurel, MD (US); Kwok Foo Tom, Washington, DC (US); Edward A. Viveiros, Jr., Laurel, MD (US); Stephen D. Freeman, Ellicott City, MD (US)

(73) Assignee: America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/859,525

(22) Filed: Apr. 27, 2020

(51) Int. Cl.
*H04B 1/00* (2006.01)
*H04B 1/16* (2006.01)
*H04B 1/12* (2006.01)
*H04B 1/10* (2006.01)
*H04B 1/30* (2006.01)

(52) U.S. Cl.
CPC ........... *H04B 1/126* (2013.01); *H04B 1/1027* (2013.01); *H04B 1/1638* (2013.01); *H04B 1/30* (2013.01); *H04B 2001/1054* (2013.01); *H04B 2001/1072* (2013.01); *H04B 2001/307* (2013.01)

(58) Field of Classification Search
CPC .... H01B 1/0028; H01B 1/1036; H01B 1/123; H01B 1/126; H01B 1/719; H01B 10/60; H01B 17/318; H01B 1/30; H01B 1/40; H01B 1/69; H01B 1/71; H01B 1/662; H01B 1/667; H01B 1/709; H01B 10/69; H04W 72/082; H04W 52/0245; H04W 88/02; H04L 1/0045; H04L 1/0048; H04L 7/0029; H04L 7/007; H04L 7/0079; H04L 25/08;
(Continued)

(56) References Cited

U.S. PATENT DOCUMENTS

| 8,213,550 B2 * | 7/2012 | Ballester | ................ | H04B 1/719 375/340 |
| 8,488,724 B2 * | 7/2013 | Daneshrad | ............... | H04B 1/10 375/346 |

(Continued)

OTHER PUBLICATIONS

A. Barel and Y. Rolain, "A microwave multisine with known phase for the calibration of narrowbanded nonlinear vectorial network analyzer measurments," IEEE MTT-S Int. Microwave Symp. Dig., pp. 1499-1502, 1998.
(Continued)

*Primary Examiner* — Quochien B Vuong
(74) *Attorney, Agent, or Firm* — Eric B. Compton (57) ABSTRACT

Apparatus for augmenting a received signal comprising a receiver configured to receive a signal, a digitizer configured to generate a digitized version of the received signal at two different times, and a signal processor, coupled to the digitizer, configured to determine a phase relationship between the digitized signals at the two different times, adjust a phase of at least one of the digitized signals based on the phase relationship to combine the two digitized signals to form an augmented signal.

17 Claims, 12 Drawing Sheets

(58) Field of Classification Search
CPC . H04L 27/22; H04L 27/2602; H04L 27/2647; H04L 27/3881
See application file for complete search history.

(56) References Cited

U.S. PATENT DOCUMENTS

| | | | |
|---|---|---|---|
| 8,537,050 | B2 | 9/2013 | Freeman et al. |
| 8,610,771 | B2 * | 12/2013 | Leung .................... H04N 5/225 348/143 |
| 9,306,590 | B2 * | 4/2016 | Knierim ................ H03M 1/121 |
| 9,562,962 | B2 | 2/2017 | Keller, III |
| 10,560,128 | B2 * | 2/2020 | Oh ........................ H04B 1/0028 |
| 2019/0049575 | A1 | 2/2019 | Ranney et al. |

OTHER PUBLICATIONS

J. Jargon, D. DeGroot, K.C. Gupta, A. Cidronali, "Calculating Ratios of Harmonically Related, Complex Signals with Application to Nonlinear Large-Signal Scattering Parameters," IEEE 60th ARFTG Conference Digest, Fall 2002, pp. 113-122.

K. Remley, D. Williams, D. Schreurs, G. Loglio, A. Cidronali, "Phase detrending for measured multisine signals," IEEE 61st ARFTG Conference Digest, Spring 2003, pp. 73-83.

Jesse B. Hoagg, et al., "Sequential Multisine Excitation Signals for System Identification of Large Space Structures," Conference Paper Preprint, Sep. 2005.

M. Yaagoubi, G. Neveux, D. Barataud, J.-M. Nebus, J. Verspecht, "Accurate Phase Measurements of Broadband Multitone Signals using a Specific Configuration of a Large Signal Network Analyzer," Proceedings of the IEEE Microwave Theory and Techniques Symposium 2006, pp. 1448-1451.

D. Wisell, D. Rönnow, P. Händel, "A Technique to Extend the Bandwidth of an RF Power Amplifier Test Bed," IEEE Transactions on Instrumentation and Measurement, vol. 56, No. 4, Aug. 2007, pp. 1488-1494.

Guangyu Gao and Lihua Lei, Photonics-Based Broadband RF Spectrum Measurement With Sliced Coherent Detection and Spectrum Stitching Technique, IEEE Photonics Journal, vol. 9, No. 5, Oct. 2017.

Declaration of Kenneth I. Ranney regarding the paper titled: "RF Bandwidth Augmentation for Passive Target Detection," which was presented at the 2019 MSS Joint (BAMS and NSSDF) Conference held Oct. 21-24, 2019 in San Diego, CA. (Declaration dated Apr. 27, 2020).

* cited by examiner

METHOD AND APPARATUS FOR PERFORMING SIGNAL AUGMENTATION

GOVERNMENT INTEREST

The invention described herein may be manufactured, used and licensed by or for the U.S. Government.

BACKGROUND

Field

Embodiments of the present invention generally relate to the field of signal processing and, more specifically, to a method and apparatus for augmenting received signals through improving the coherent bandwidth or the integration interval of the received signals.

Description of the Related Art

Generally, detection of low-level radio frequency (RF) signals often requires the use of small measurement bandwidths and long integration times. Small bandwidths are necessary to avoid interference and reduce noise, while long integration times are required to further increase low signal-to-noise ratios (SNRs). Thus, in order to sense over a wide bandwidth, it becomes necessary to combine measurements taken across these smaller frequency bands.

Some currently available systems address this problem by concatenating non-coherent data collected within multiple sub-bands. Although this approach increases the extent and, therefore, the utility of the spectrum measurement, it also eliminates the possibility of further coherent processing of any frequency data of interest. Such coherent processing could be used to increase either the available bandwidth or the length of the coherent processing interval (CPI), depending on the desired application.

Research in techniques to "stitch" together sub-band signals into larger bandwidth signals generally requires a priori knowledge of the operational frequencies or knowledge of the multisine component spacing. Most applications leverage known user-generated multisine test signals to enable unknown signals to be processed into larger bandwidth signals.

Therefore, there is a need in the art for a method and apparatus for signal processing a received signal to augment characteristics of the signal.

SUMMARY

Embodiments of the present invention include a method and apparatus for augmenting a received signal comprising a receiver configured to receive a signal, a digitizer configured to generate a digitized version of the received signal at two different times, and a signal processor, coupled to the digitizer, configured to determine a phase relationship between the digitized signals at the two different times, adjust a phase of at least one of the digitized signals based on the phase relationship to combine the two digitized signals to form an augmented signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
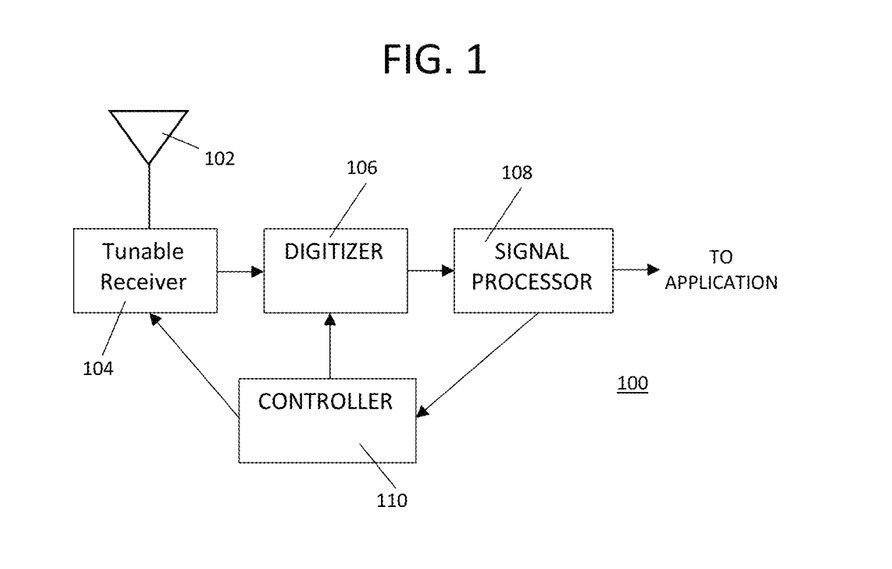
FIG. 1 depicts a block diagram of a signal processing system in accordance with an embodiment of the present invention.

FIG. 1 depicts a block diagram of a signal processing system 100 in accordance with an embodiment of the present invention. The system 100 comprises an antenna 102, tunable receiver 104, a digitizer, 106, a signal processor 108 and a controller 110. The system 100 is configured to measure spectra within designated radio frequency bands and create large, coherent spectral bands from smaller spectral bands collected at different times. Coherence is achieved through exploitation of harmonically related pilot tones, which are either available in situ or provided by the system, and the extension is valid at multiples of the difference in frequency between the related pilot tones. Since the source of all tones is the same, the source can be better detected and located using the coherent (processed) data produced by the system 100. As shall be described in detail below, a dual approach can be used within a single band to extend the length of a coherent processing interval. The coherent data produced by the signal processor 108 is provided to an application that performs further signal processing, e.g., source geo-location, and/or detection.

The system exploits the stationarity and periodicity of available multisine signals that are coherently measured within an overlap region between two spectral bands (i.e., in-phase and quadrature samples are available). These RF tones, available within the environment, provide common phase references for both of the overlapping frequency blocks. The references, in turn, enable the two bands to be coherently "stitched", yielding a larger band that is coherent at frequencies constituting the multisine signal. The resulting wider-bandwidth signal (i.e., coherent data) can then be processed to more effectively detect and/or locate a device transmitting such a multi-tone signal. Note that, in addition to extending measured bandwidth, the technique could also be used to coherently align data recorded at different times within a common frequency band. This coherently aligned data could then be further integrated (processed) to increase system sensitivity and downstream algorithm effectiveness.

For example, assume that I/Q (coherent) RF data is measured across a lower band of frequencies at time to and that this lower band contains components of a multisine signal (i.e., tones) exhibiting a linear phase relationship as a function of frequency. In addition, assume that the same system measures a higher band at a later time, ti, and this band contains the same tones exhibiting a (possibly different) linear phase relationship as a function of frequency. Designating the slopes of these two lines $s_0$ and $s_1$, respectively; it becomes possible to determine the time offset, $t_1-t_0$, by examining the difference in slopes, $s_1-s_0$. This difference is then used to adjust the phases of frequency domain samples within an overlap band measured at $t_1$ so that their phases match those measured at $t_0$. Samples at frequencies outside of the overlap region can then be adjusted by applying the same linear phase adjustment, because of the assumed nature of the underlying multi-sine signal.

Although the examples embodiments and experiments are described herein with respect to RF signals, embodiments of the invention may find use to process non-RF signals such as, for example, acoustic signals or seismic signals.

Figure 2:
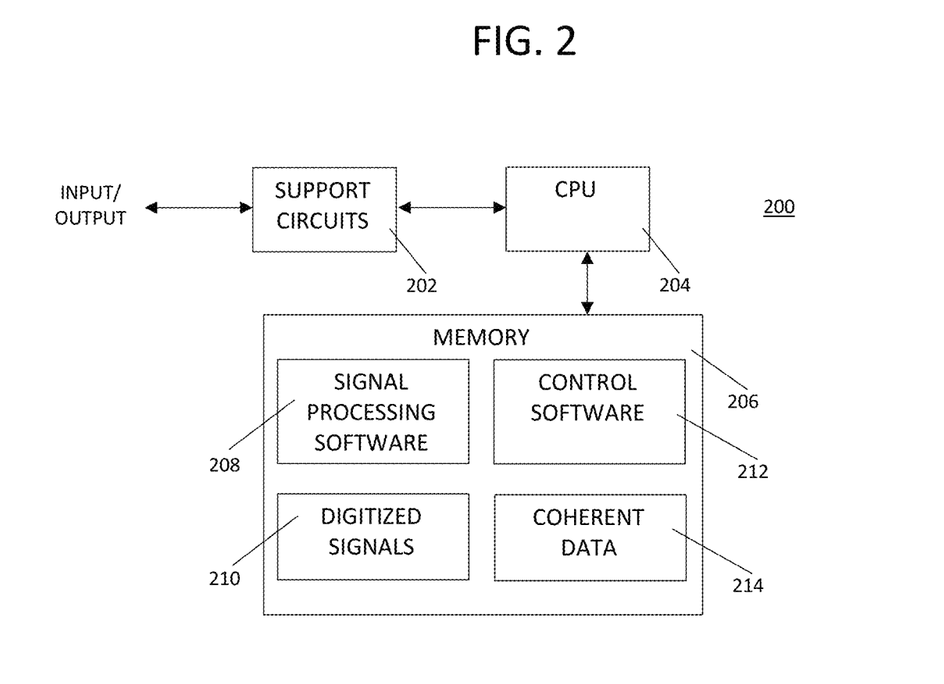
FIG. 2 depicts a block diagram of a practical implementation of the signal processing system of FIG. 1.

The system 100 collects signal samples at different times, digitize the collected signals and then process those signals into coherent data. The functional blocks of FIG. 1 are generally implemented with a computer 200, as depicted in FIG. 2. The computer 200 comprises support circuits 202, one or more central processing units (CPUs), and memory 206. The functional blocks (digitizer 106, signal processor 108 and controller 110 of FIG. 1) may be implemented in a single computer 200 or over multiple computing devices. In fact, each block could be implemented as its own standalone device. The digitizer 106 may also be a component of the receiver 104 such that the input to the computer 200 is a digital signal. Alternatively, the computer 200 may digitize an analog signal from the receiver 104 such that the digitizer is a component of the support circuits 202.

The support circuits 202 may contain the digitizer 106 as well as well-known circuits such as clocks, power supplies, buffers, input/output communications circuits and the like. The CPU 204 may include one or more microprocessors, microcontrollers, and the like. The CPU 204 can be programmed to provide signal processing and/or control functions utilizing the signal processing software 208 and/or the control software 212. The memory 206 may comprises random access memory, read only memory, and the like. The memory 206 stores the signal processing software 208, digitized signals 210, control software 212 and coherent data 214 resulting from processing the digitized signals 210 in accordance with embodiments of the invention.

The multisine signals of interest received at the antenna 102 comprise a sum of sinusoids that exhibit highly structured relationships between the phases of their constituent frequencies. In particular, the values of phase versus frequency within a given processing window follow a linear progression with a slope that is proportional to the time at which the data were measured. This implies that the sequence of impulses obtained by selecting multisine samples in the frequency domain yields a sequence of pulses (impulses) in the time domain that are circularly shifted relative to the samples collected at a different time. As a result, it is possible to estimate an (ambiguous) time offset between data collected at two different times by comparing the slopes of phases extracted at these discrete multisine frequencies. That is, using the signal processing software 208, periodic data collected at one time can be time-aligned with periodic data collected at a different time by adjusting phases within a common (overlapping) spectral region.

Figure 3A:
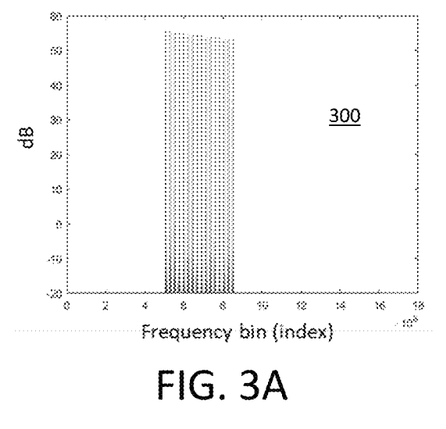
FIGS. 3A, 3B and 3C illustrate the (Fourier) relationships that embodiments of the invention exploit to augment signal attributes.
Figure 3B:
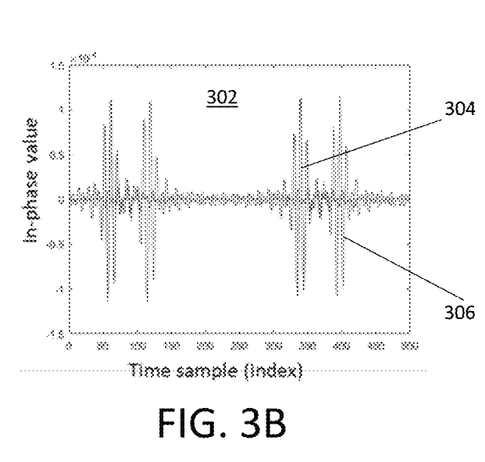
Figure 3C:
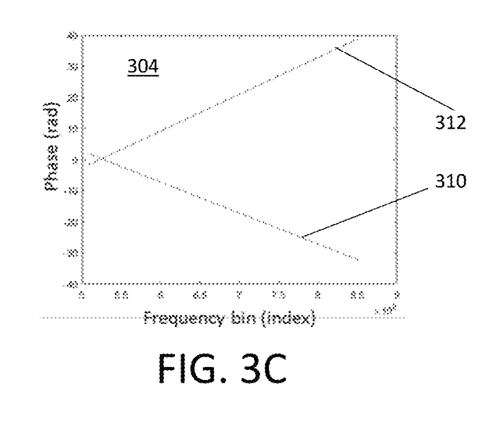

FIGS. 3A, 3B and 3C illustrate the (Fourier) relationships that embodiments of the invention exploit to augment signal attributes. Here, simulated data have been used to illustrate the underlying concepts. FIG. 3A depicts a plot 300 of a frequency domain multisine signal at two different collection times showing the 16 constituent frequencies. In the frequency domain the signals substantially overlap and cannot be differentiated. FIG. 3B depicts a plot 302 of the time domain multisine signal showing the time offset between signals 304 and 306. FIG. 3C depicts a plot 308 of phase in radians extracted at peaks in FIG. 3A vs. frequency bin index. The phase of signal 304 is represented by line 310 and the phase of signal 306 is represented by line 312.

Figure 4:
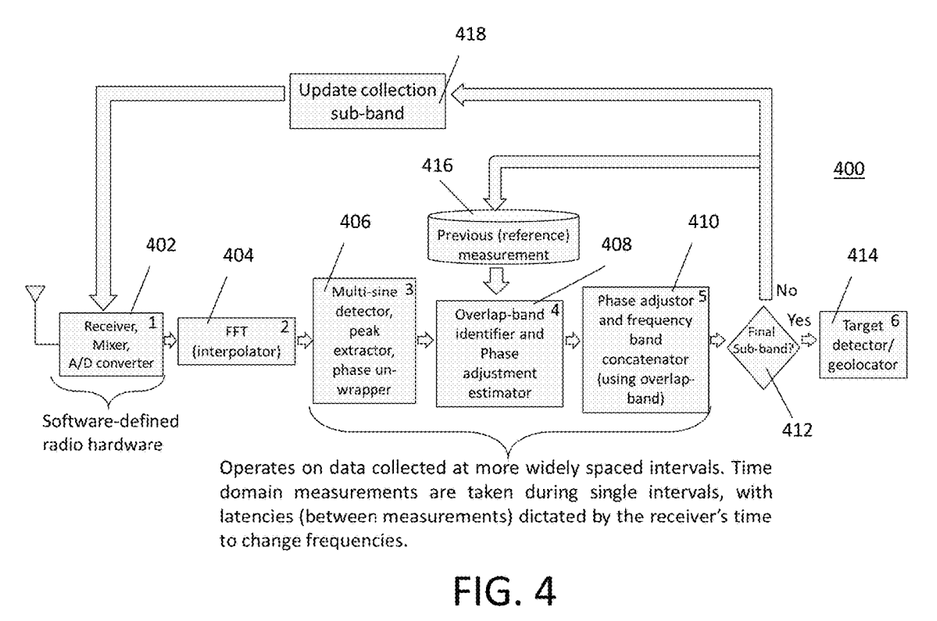
FIG. 4 is a functional block diagram of a process for augmenting the coherent bandwidth of a signal.
Figure 5:
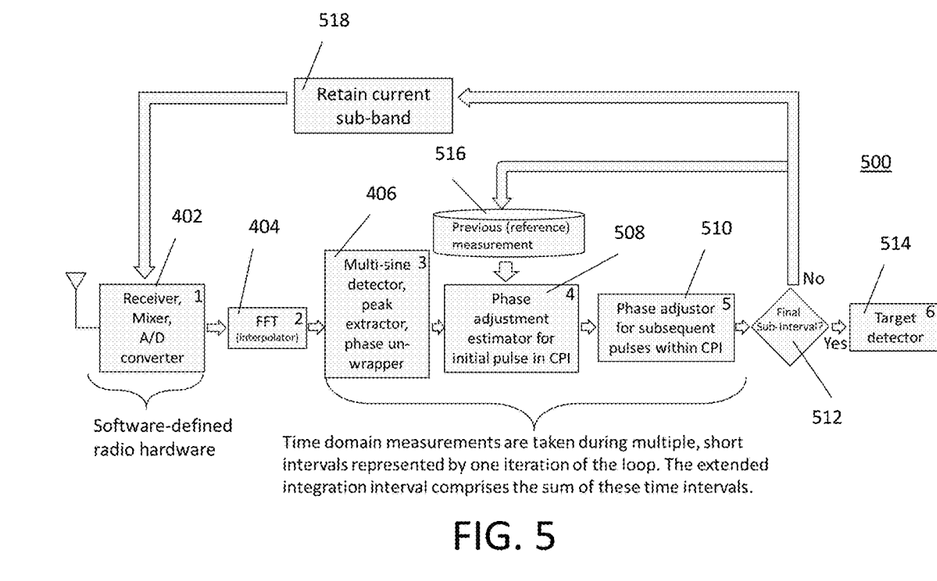
FIG. 5 is a functional block diagram of a process for augmenting the integration interval of a signal.

FIGS. 4 and 5 depict functional block diagrams 400 and 500, respectively, detailing two operational modes of performing signal processing in accordance with embodiments of the invention. In each case, at step 402, the tunable receiver 104 generates input data as in-phase and quadrature (I/Q), time-domain samples. In this embodiment, the receiver 104 comprises a mixer for downcoverting the input RF signal and an A/D converter to digitize the downconverted signal. The output is the digitized time domain signals 210 of FIG. 2. The time domain signals are then converted to the frequency domain via the fast Fourier transform (FFT) process step 404.

The next step 406 is also the same for both modes in diagrams 400 and 500. In step 406, the system detects regularly spaced frequency domain peaks corresponding to the multisine signal, and retains I/Q values at these peak locations. That is, the real (in-phase) and imaginary (quadrature) components produced by the FFT at these locations are retained.

Figure 6:
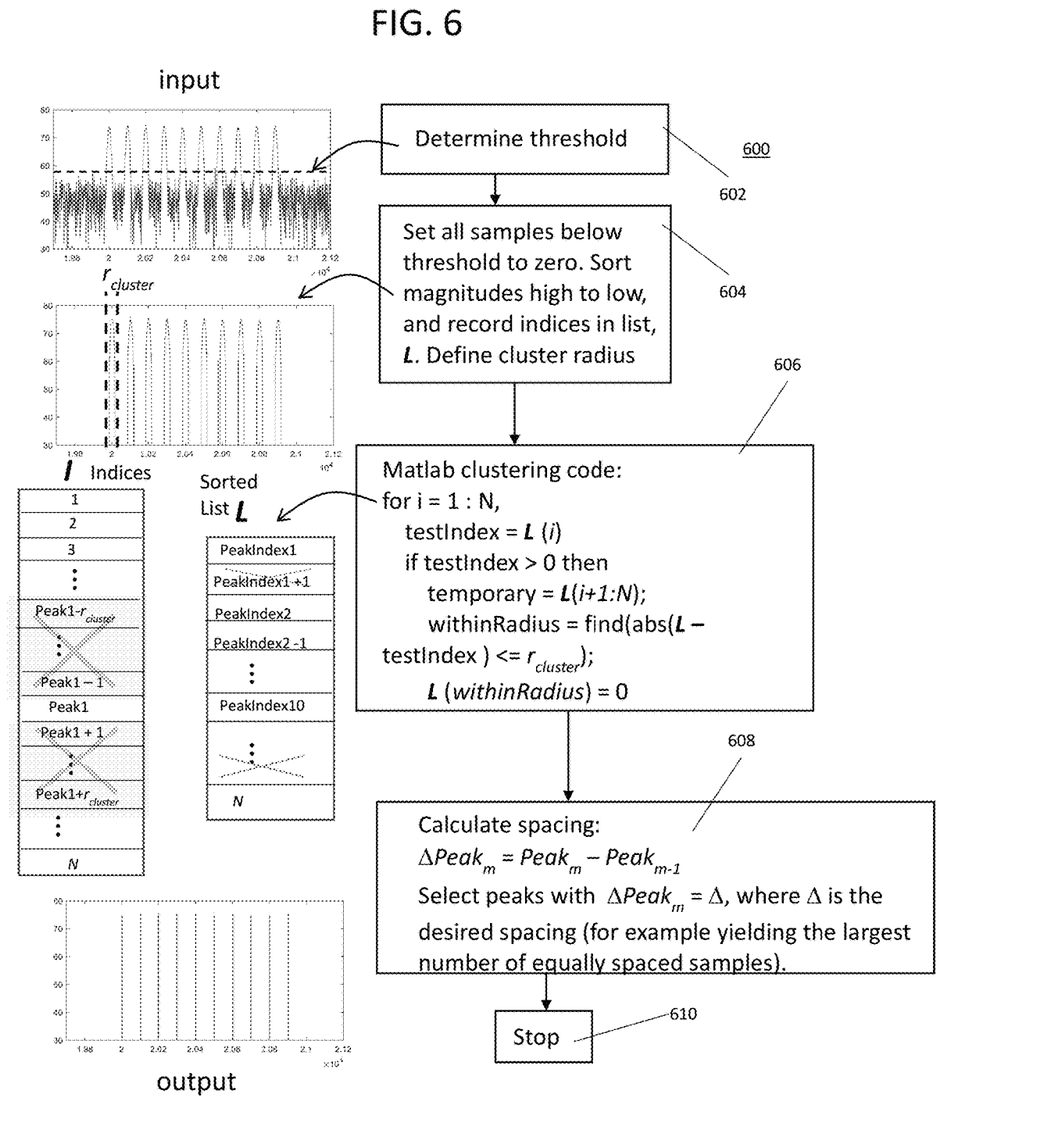
FIG. 6 is a functional block diagram of a process for performing signal peak location in accordance with one embodiment.

One possible peak-location procedure is depicted by the block diagram 600 of FIG. 6. As an initial step (step 602), the locations (FFT indices) of all magnitudes exceeding a predetermined threshold are identified. At step 604, magnitude values at all other locations are set to zero. This threshold could be based on statistics of the magnitudes (for example: $\mu+2\sigma$ or the $60^{th}$ percentile, where $\mu$ is the sample mean and $\sigma^2$ is the sample variance). At step 604, the magnitudes are then sorted in descending order, and a corresponding list, L, of FFT indices is created. Next, at step 606, each element of L, represented by L(i), greater than zero is compared to the remaining elements, L(i+1:N). Elements of L(i+1:N) falling within a given radius, $r_{cluster}$, of L(i) are then set to zero. After all values of i have been processed, at step 608, the remaining, non-zero elements of L represent the indices (locations) of the desired peaks. The procedure stops at step 610.

As part of this process, the unwrapped, detected phases are examined to ensure that a linear progression (as a function of frequency) is evident. Note that such an operation can be implemented using a software package such as Matlab®, which is produced by Mathworks and is familiar to practitioners of the art. A Matlab command producing the unwrapped phase progression is F=unwrap(angle(X)), where X is the vector of I/Q samples extracted from the detected FFT peaks. Here, the function angle(X) calculates the phase of each sample, and unwrap(•) unwraps the phase. The linearity of the progression can be determined, for example, by solving:

$$\min_{k,b}\{((F(n)-(mn+b))^2\},$$

which yields the slope and y-intercept estimates that produce the minimum, mean-squared error. Here, mn+b is the equation of the straight line, and n=kΔn, multiples of the frequency sample spacing. An error below a pre-determined level indicates that the progression is well-represented by a straight line with the estimated parameters. For example, this pre-determined level could be 0.1% of the average of the absolute value of all unwrapped phases across the band used for parameter estimation. If no such linear relationship exists, then the process terminates. If the relationship exists and this is the first data block collected, then the samples are stored for use as a reference when adjusting the remaining frequency domain samples within a coherent processing interval (CPI). For the bandwidth extension configuration of diagram 400, the CPI corresponds to the interval during which data is collected over the set of sub-bands constituting a larger, constructed frequency band. For the integration interval extension configuration of diagram 500, the CPI corresponds to the interval during which several measurements are taken within the same, narrow band.

Both approaches, however, share the same step 406. That is, uniformly spaced peaks are identified within the spectra measured at different times, and I/Q samples are extracted from these locations. Note that the spectral peak spacing is be the same for data collected at different times. In addition, at least one peak from the two measurement sets correspond to the same frequency to perform bandwidth extension, and all frequencies used from within the two measurement sets are the same to perform time interval extension (enhanced Doppler estimation). Since there are subtle differences between the implementations, they will each be described separately in more detail, noting both similarities and differences.

Bandwidth Extension Configuration (diagram 400 of FIG. 4)

If the bandwidth extension configuration is implemented, then, at step 408, the subset of available component sine waves occupying an "overlap" band are identified. The identified "overlap" band comprises a set of frequencies common to both measurements, and it is a user-defined parameter. A typical value could be 30% or 40% of the measurement bandwidth. Hence, if $X_0(n)$ is the FFT from band 0 and $X_1(n)$ is the FFT from band 1, then $X_0(N-p+1:N)$ contains samples from the same frequencies as $X_1(1:p)$, where p is the number of samples in the overlap band. These samples are next used to calculate the slope of the identified linear phase progression (e.g., as depicted in FIG. 3C). (Note that additional samples, not in the overlap region, could be used to calculate the slope; but at least one reference phase must be available within the overlap region to serve as a "tie point" for combining the two bands.) Once this slope has been determined, at step 410, the slope is eliminated from the complex frequency domain samples via the following phase adjustment:

$$S_{0,adjusted}(n)=S(n)e^{-j(k_0n+\theta_0)}$$

$$S_{1,adjusted}(n)=S(n)e^{-j(k_1n+\theta_1)}, \quad (1)$$

where $S_i(n)$ $i\in\{0,1\}$, is the frequency domain representation of the multisine signal i after peak extraction, $k_i$ is the estimated slope (Δφ/Δn), $\theta_i$ is phase offset (y-intercept) determined by the line-fitting routine, and $n\in\{0,\ldots,N-1\}$ is the frequency bin index. Note that this operation attempts to force the phases of all frequencies within the band to zero. Hence, following step 410, the phases of samples within the new band are aligned and the two bands can be concatenated. (Samples from either band can be used in the frequency bins constituting the overlap region.) This concatenation operation can be represented by the Matlab pseudo-code segment: concatenationOutput=[$S_{0,adjusted}$(1:N); $S_{1,adjusted}$(p+1:N)], where p is the number of samples in the overlap band.

Typically, all of the samples used to estimate the slope lie within the overlap band; however, this need not be the case. A single frequency "tie point" which is common two bands could provide a reference for testing alignment between the two band segments. Note that by increasing bandwidth, the system increases time domain resolution, an important advantage when time-domain processing is preferred (or required).

At step 412, the process of diagram 400 queries whether a final sub-band has been processed. (Note that the final subband corresponds to the final subband measured.) If the query is affirmatively answered, the process ends at step 414 by storing the coherent data in memory and/or sending the data to an application such as a target detector or geolocator. If the query at step 412 is negatively answered, the process stores the previous measurement at step 416 and updates the collection sub-band to a new sub-band to be analyzed at step 418.

Integration Interval Extension Configuration (Diagram 500 of FIG. 5)

If the "integration interval extension" configuration of diagram 500 is implemented, then all of the component sine waves occupy the same band, rather than two overlapping sub-bands. Hence, more samples are available for estimating the adjustment parameters at step 508. Since the same sub-band is repeatedly used, there is no need to alter the receiver from one measurement to the next, and there is no need to extract samples from an overlap region (i.e., step 518 maintains the same band). Once adjusted at step 510, the samples are simply integrated (coherently) to increase signal-to-noise ratio (SNR). This operation is summarized by:

$$\Sigma_{i=1}^{N_{meas}}\hat{F}_i(n),$$

where $\hat{F}_i(n)$ denotes the adjusted multi-sine measurement for interval i, and $N_{meas}$ represents the number of measurement intervals available for integration.

At step 512, the process of diagram 500 queries whether a final sub-interval has been processed. If the query is affirmatively answered, the process ends at step 514 by storing the coherent data in memory and/or sending the data to an application such as a target detector or geolocator. If the query at step 512 is negatively answered, the process stores the previous measurement at step 516 and, at step 518, the sub-band is not altered and the next sub-interval of signal is collected in the same sub-band.

Experimental Validation

In order to validate underlying hypotheses, data were recorded at widely separated times against a multisine source.

Figure 7:
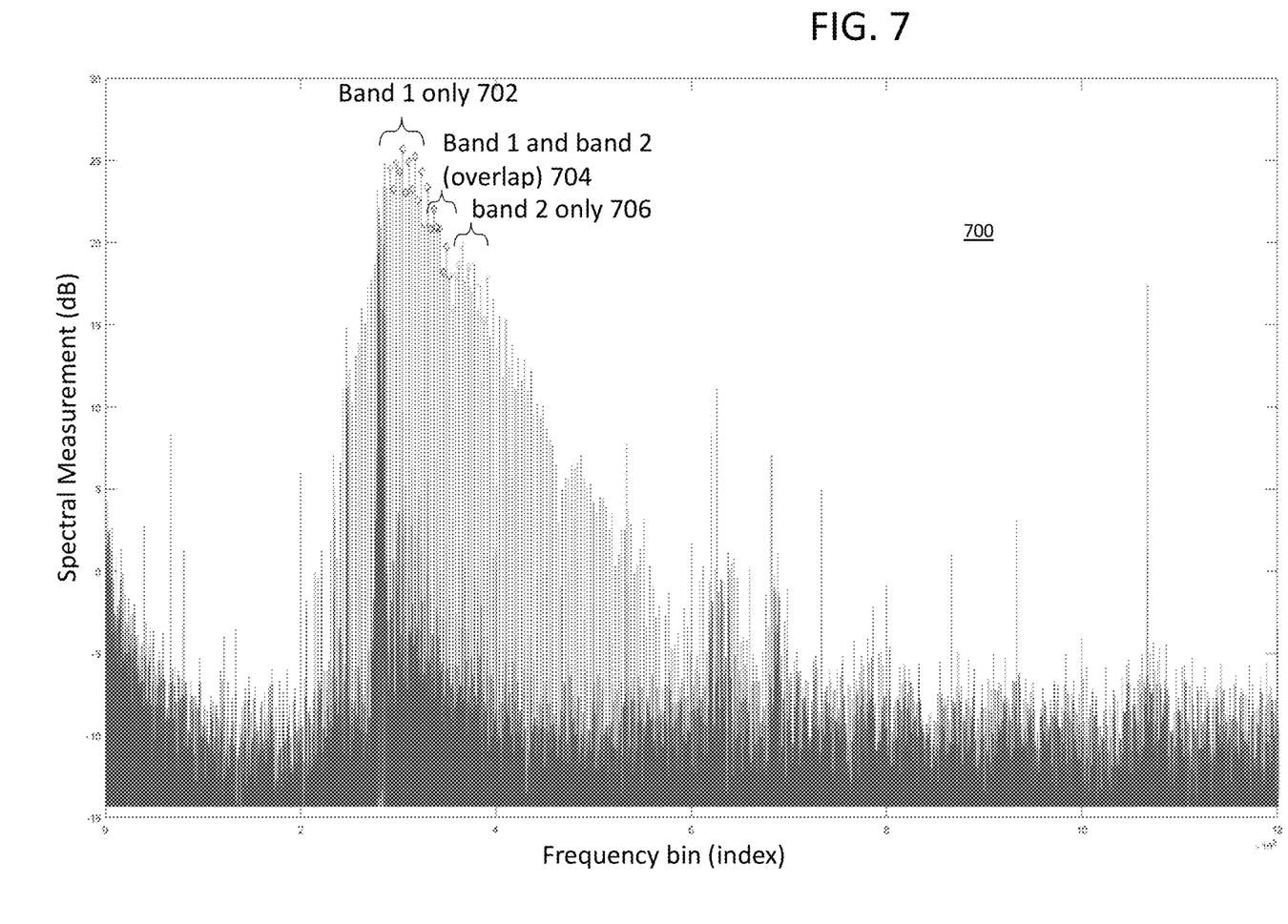
FIG. 7 depicts a signal spectrum of a multi-sine signal.
Figure 8:
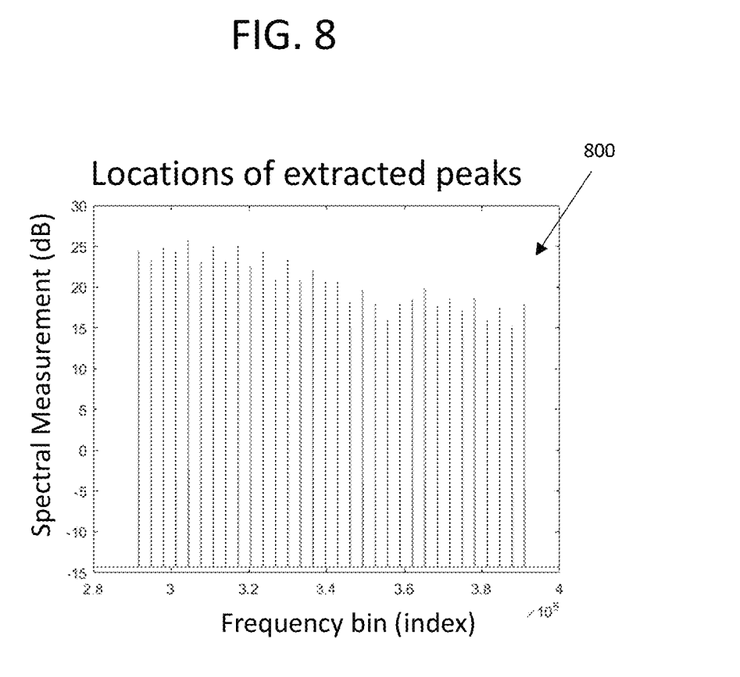
FIG. 8 depicts a graph of locations of extracted signal peaks.
Figure 9:
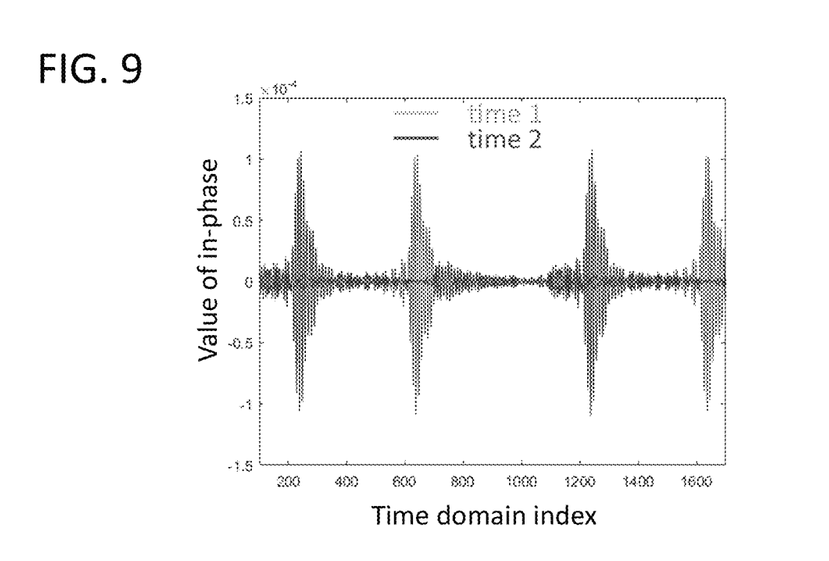
FIG. 9 depicts a graph of in-phase time domain waveforms to be processed by a bandwidth extension embodiment.
Figure 10:
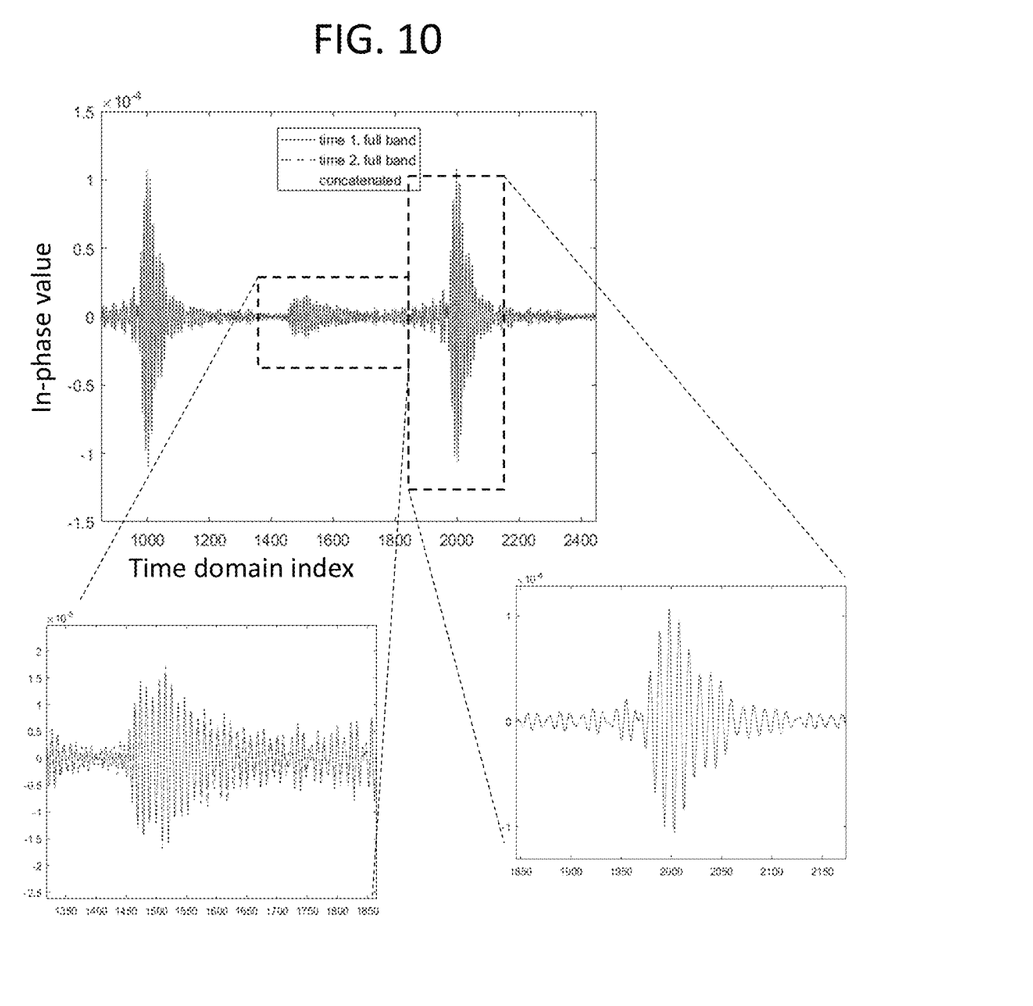
FIG. 10 depicts a graph of output produced by the bandwidth extension embodiment.
Figure 11:
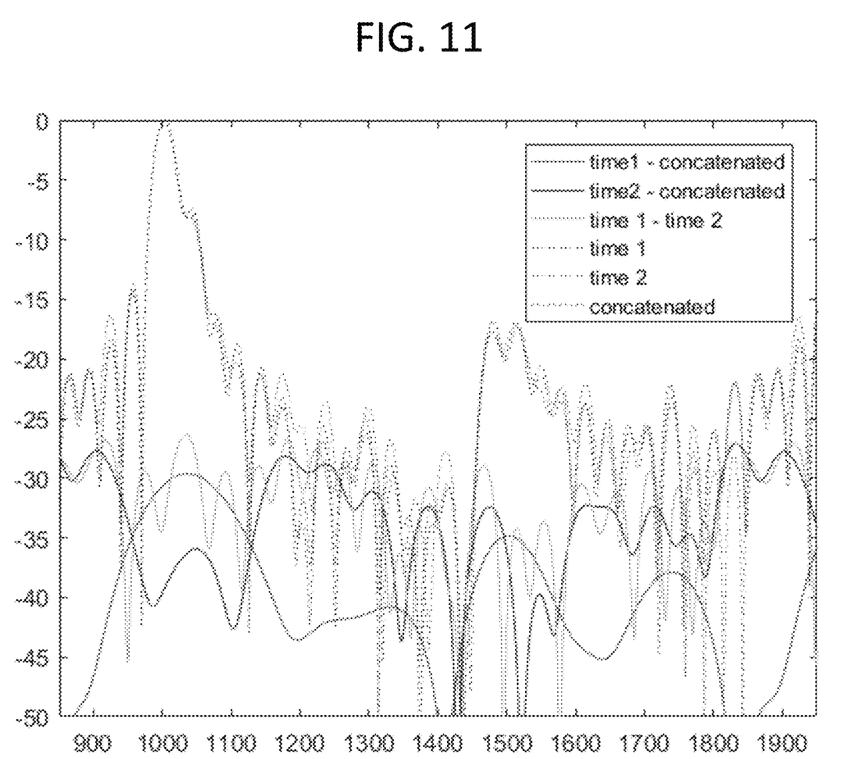
FIG. 11 depicts a graph of the augmented bandwidth signal produced by the bandwidth extension embodiment.

The target signal was filtered to ensure availability of a signal bandwidth wide enough to create two sub-bands with approximately 40% overlap. In this way, the "concatenated" (bandwidth-extended) signal could be compared to the full-band version of the original signals (collected at two different times). That is, the in-phase part of the concatenated signal could be compared to the in-phase part of the adjusted, full-band signals collected at times 1 and 2. The spectrum 700 of the measured multi-sine signal is depicted in FIG. 7, showing: (a) the lower band (band 1) 702, the overlap band 704, and the upper band (band 2) 706, and (b) FIG. 8 depicts the locations of the extracted peaks 800. FIG. 9 shows the in-phase, time-domain waveforms obtained for data measured using the full band (band 1 and band 2) at time 1 and again at time 2. Here, the time-domain offset between the collection times is clearly evident. FIG. 10 shows output produced by the bandwidth extension embodiment, together with suitably adjusted, full-band, in-phase signals measured at time 1 and at time 2. The adjusted versions of the signals collected at time 1 and time 2, as well as the concatenated signal created using band 1 from time 1 and band 2 from time 2 match extremely well. This point is further illustrated by the plots in FIG. 11. Here the solid curves indicate that the difference between the created, augmented bandwidth signal is similar to the difference between the suitably adjusted full-band signals measured at time 1 and again at time 2. These "errors" are approximately 30 dB lower than the peak signal level indicated by the peak of the dashed curves. The created, augmented bandwidth agrees well with "truth"—the full-band signals collected at different times.

Figure 12:
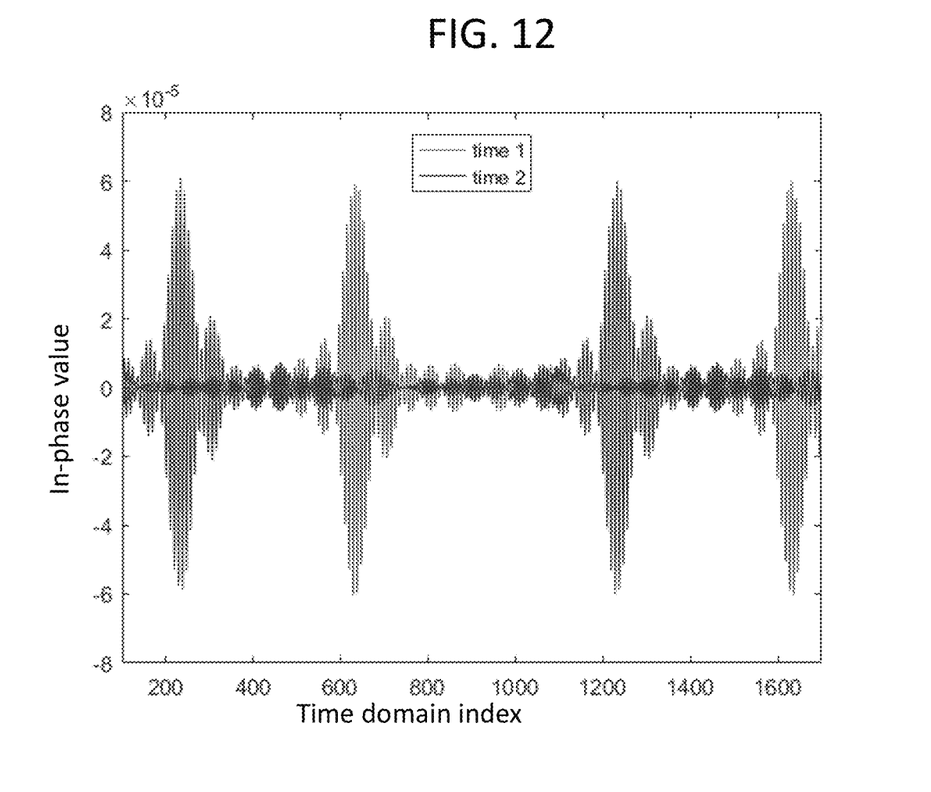
FIG. 12 depicts a graph of in-phase time domain waveforms to be processed by a integration interval extension embodiment.
Figure 13:
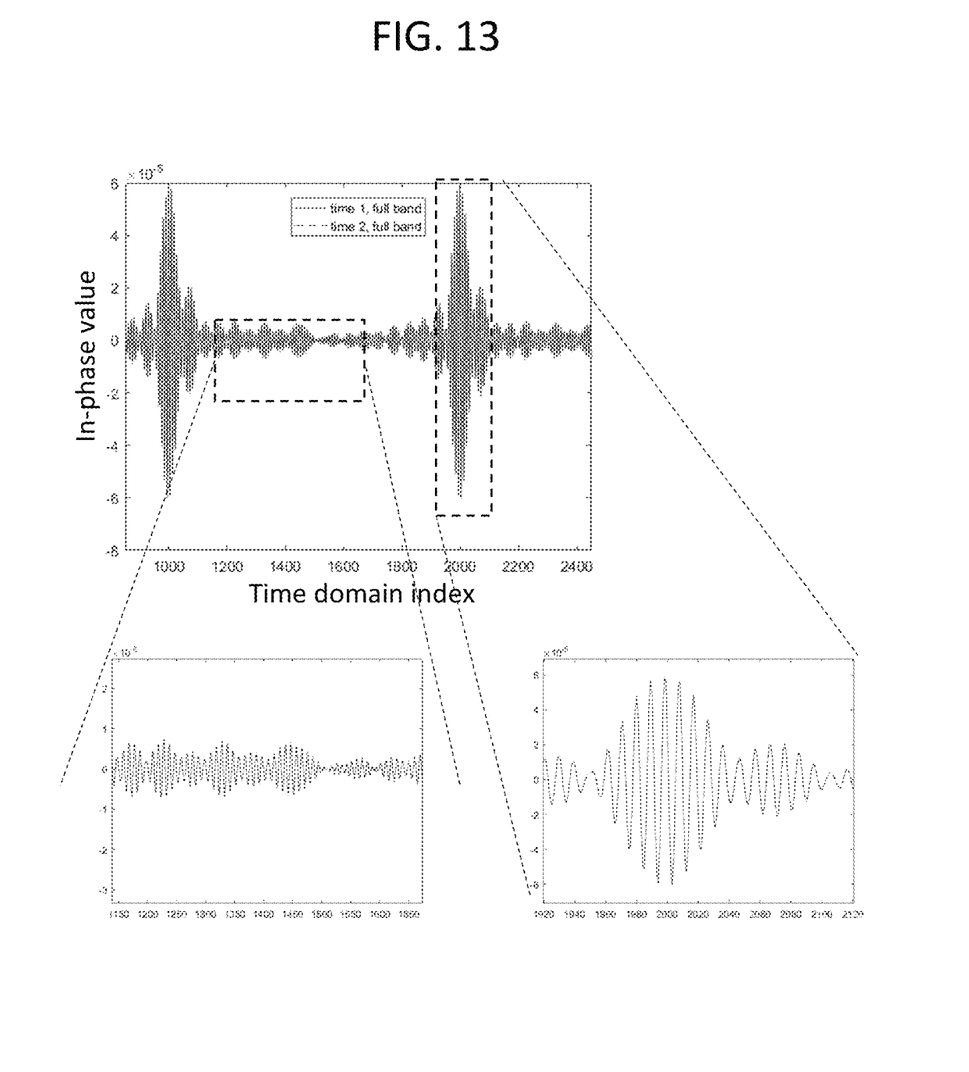
FIG. 13 depicts a graph of output produced by the integration interval extension embodiment.
Figure 14:
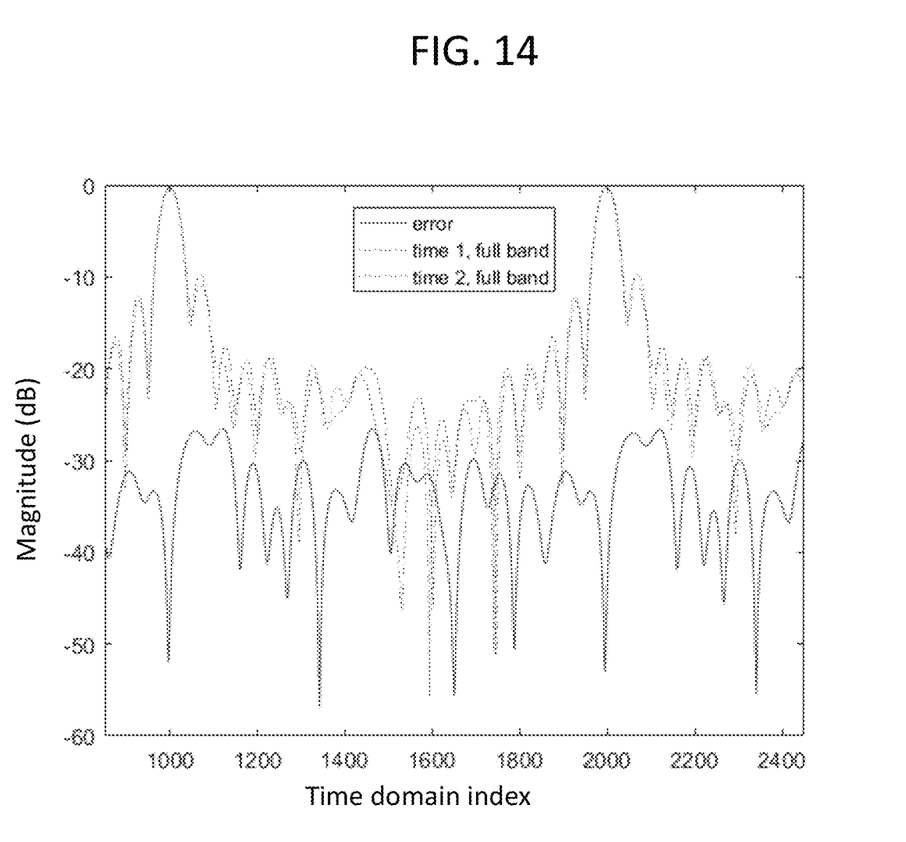
FIG. 14 depicts a graph of the augmented bandwidth signal produced by the integration interval extension embodiment.

A similar experiment was performed to validate the integration interval extension implementation. In this case, the same band was selected for both collection times, and the data were aligned using all samples collected at each time. Again, the real part of the adjusted in-phase signals from time 1 and time 2 provided an indication of the alignment effectiveness. FIG. 12, FIG. 13, and FIG. 14 include plots analogous to those in FIG. 9, FIG. 10, and FIG. 11. Once again, the waveforms match extremely well, and the differences between the integration interval extension waveform and the reference (truth) waveform are quantifiably small. From this analysis it was clear that multiple, aligned waveforms can be coherently added to increase SNR.

The use of pilot tones to extend measurement bandwidth has been documented for cases where measurement intervals are arbitrarily long and the pilot tones are controlled by the experimenter. These applications are typically concerned with determining the characteristics of a device under test. The system embodiments of the present invention, however, leverage signals available in situ, and, because of this, they incorporate peak detection, peak extraction, and multisine signal verification stages. When operating in this way, the embodiments require no a priori knowledge of a target device's characteristics; it identifies potential multisine signals and tests for the requisite phase relationships between the constituent frequencies.

Figure 15:
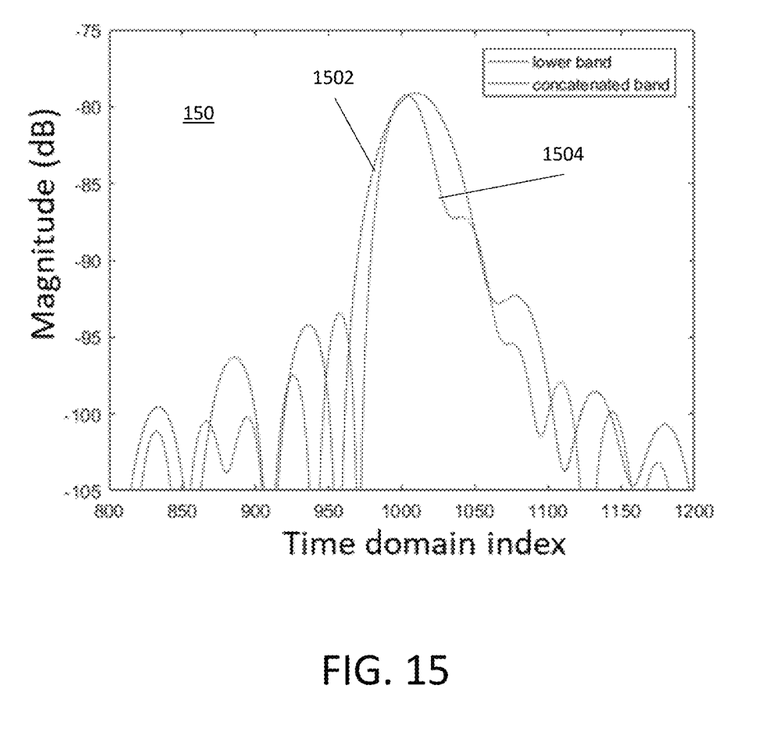
FIG. 15 depicts an envelope of a time domain signal having an augmented coherent bandwidth in accordance with an embodiment of the invention.

In addition to increasing SNR, the bandwidth extension also increases resolution in the time domain. FIG. 15 shows a graph 1500 of an envelope of the time domain signal both before (graph 1502) and after bandwidth extension (graph 1504). Downstream detection and location algorithms would have access to higher resolution, higher-SNR data, enabling them to better detect a target and (possibly) estimate its position.

Note that pilot tones could also be employed if: (i) the target signal is known a priori, and (ii) the detector is able to forfeit certain frequency samples without suffering significant performance degradation. This, however, would introduce an active component, possibly allowing adversaries to detect system users.

Embodiments of the invention are designed to increase the amount of coherent bandwidth available for processing when low-bandwidth, high-sensitivity receivers are required. By increasing the amount of coherent data available for downstream processing, embodiment of the invention are designed to engender new, more effective target detection paradigms.

As noted above, embodiments of the invention could be used as part of a surveillance or threat-detection system looking for devices that produce a multisine signal. Embodiments of the invention could also be used to detect devices configured to transmit such a signal if its owner were trapped or lost. This would be particularly relevant if the signal emerging from the environment were severely attenuated.

While the foregoing is directed to embodiments of the present invention, other and further embodiments of the invention may be devised without departing from the basic scope thereof, and the scope thereof is determined by the claims that follow.

| REFERENCE NUMERALS |  |
| --- | --- |
| ARL 19-36 |  |
| 100 | signal processing system |
| 102 | antenna |
| 104 | receiver |
| 106 | digitizer |
| 108 | signal processor |
| 110 | controller |
| 200 | computer |
| 202 | support circuits |
| 204 | CPU |
| 206 | memory |
| 208 | signal processing software |
| 210 | digitized signals |
| 212 | control software |
| 214 | coherent data |
| 300 | frequency domain plot |
| 302 | time domain plot |
| 304 | signal (first time) |
| 306 | signal (second time) |
| 308 | phase plot |
| 310 | signal 304 phase line |
| 312 | signal 306 phase line |
| 400 | functional block diagram |
| 402 | step |
| 404 | step |
| 406 | step |
| 410 | step |
| 412 | step |
| 414 | step |
| 418 | step |
| 500 | functional block diagram |
| 508 | step |
| 510 | step |
| 512 | step |
| 514 | step |
| 516 | step |
| 518 | step |
| 600 | block diagram |
| 602 | step |
| 604 | step |
| 610 | step |
| 700 | measured spectrum |

-continued

| REFERENCE NUMERALS | |
|---|---|
| ARL 19-36 | |
| 702 | lower band |
| 704 | overlap band |
| 706 | upper band |
| 800 | extracted peaks |
| 1500 | time domain envelope graph |
| 1502 | graph (before expansion) |
| 1504 | graph (after expansion) |

The invention claimed is:

1. Apparatus for augmenting a received signal comprising:
 a receiver configured to receive a signal;
 a digitizer configured to generate a digitized version of the received signal at two different times;
 a signal processor, coupled to the digitizer, configured to determine a phase relationship between the digitized signals at the two different times, adjust a phase of at least one of the digitized signals based on the determined phase relationship, and combine the two digitized signals to form an augmented signal.

2. The apparatus of claim 1, wherein the signal is a multisine signal.

3. The apparatus of claim 1, wherein the augmented signal has a bandwidth that is larger than a bandwidth of the received signal.

4. The apparatus of claim 1, wherein the augmented signal has an integration interval that is larger than the integration interval of the received signal.

5. The apparatus of claim 1, wherein the augmented signal has a higher signal to noise ratio than the received signal.

6. A method for augmenting a received signal using the apparatus of claim 1, the method comprising:
 receiving a signal;
 generating a digitized version of the received signal at two different times;
 determining a phase relationship between the digitized signals at the two different times, adjusting a phase of at least one of the digitized signals based on the phase relationship to enable the two digitized signals to be combined to form an augmented signal.

7. The method of claim 6, wherein the signal is a multisine signal.

8. The method of claim 6, wherein the augmented signal has a bandwidth that is larger than a bandwidth of the received signal.

9. The method of claim 6, wherein the augmented signal has an integration interval that is larger than the integration interval of the received signal.

10. The method of claim 6, wherein the augmented signal has a higher signal to noise ratio than the received signal.

11. Apparatus for augmenting a received signal comprising:
 a receiver configured to receive a signal;
 a digitizer configured to generate a digitized version of the received signal at two different times and in two different frequency sub-bands;
 a signal processor, coupled to the digitizer, configured to determine a phase relationship between the digitized signals at the two different times and sub-bands, adjust a phase of at least one of the digitized signals based on the phase relationship to combine the two digitized signals to form an augmented signal having an extended bandwidth.

12. The apparatus of claim 11, wherein the signal is a multisine signal.

13. The apparatus of claim 11, wherein the augmented signal has an extended bandwidth that is larger than a bandwidth of the received signal.

14. The apparatus of claim 11, wherein the extended bandwidth is substantially equal to concatenated bandwidths of the two digitized signals at different times.

15. Apparatus for augmenting a received signal comprising:
 a receiver configured to receive a signal;
 a digitizer configured to generate a digitized version of the received signal at two different times;
 a signal processor, coupled to the digitizer, configured to determine a phase relationship between the digitized signals at the two different times, adjust a phase of at least one of the digitized signals based on the phase relationship to combine the two digitized signals to form an augmented signal having an integration interval that is larger than the received signal.

16. The apparatus of claim 15, wherein the signal is a multisine signal.

17. The apparatus of claim 15, wherein the augmented signal has a higher signal to noise ratio than the received signal.

* * * * *